United States Patent [19]

Plas

[11] Patent Number: 5,537,411
[45] Date of Patent: Jul. 16, 1996

[54] DUAL BUS ACCESS NETWORK HAVING A PAIR OF VIRTUAL CIRCUITS

[75] Inventor: Patrick Plas, Paris, France

[73] Assignee: France Telecom, Paris, France

[21] Appl. No.: 362,261

[22] Filed: Dec. 21, 1994

[30]     Foreign Application Priority Data

Dec. 23, 1993 [FR]  France ................................. 93 15591

[51] Int. Cl.$^6$ .................................................. H04L 12/28
[52] U.S. Cl. .................. 370/85.1; 370/85.12; 370/85.15; 370/85.9; 370/94.1
[58] Field of Search ............................... 370/94.1, 85.12; 455/33.1, 33.2; 379/59

[56]           References Cited

U.S. PATENT DOCUMENTS

| 5,189,734 | 2/1993 | Bailey et al. | 455/33.2 |
| 5,278,892 | 1/1994 | Bolliger et al. | 379/60 |
| 5,396,543 | 3/1995 | Beeson, Jr. et al. | 379/59 |

FOREIGN PATENT DOCUMENTS

0522773A3  1/1993  European Pat. Off. .

OTHER PUBLICATIONS

Malyan, *Network Architecture and Signaling for Wireless Personal Communications*, IEEE Journal, Aug. 1993, vol. 11, No. 6, pp. 830–841.

Pollini et al., *Handover Protocols Between Metropolitan Area Networks*, IEEE Global Telecommunications Conference, 1992, pp. 11–15.

Chia, *Handover Techniques for a Third Generation Mobile System*, Nov. 1991, pp. 243–249.

*Primary Examiner*—Melvin Marcelo
*Assistant Examiner*—Melissa Kay Carman
*Attorney, Agent, or Firm*—Nilles & Nilles

[57]                ABSTRACT

Disclosed is a novel architecture for an access network of a mobile radiotelephony network formed by a dual bus or a dual counter-rotating ring to which there are connected an access point and several base stations capable of receiving several mobile stations and offering a virtual circuits service using cells whose header indicates the virtual circuit number or identifier. The use of such a network enables automatic intercellular transfer and macrodiversity without the intervention of the access point. Implementation of the invention on telecommunications networks that meet the DQDB standard and the ATM standard are also disclosed.

8 Claims, 2 Drawing Sheets

DUAL BUS ACCESS NETWORK HAVING A PAIR OF VIRTUAL CIRCUITS

BACKGROUND OF THE INVENTION

1. Field of the Invention

The present invention relates to a ring access network for a mobile radiotelephony network. It proposes a novel architecture of the access network to improve the quality of the communication, whether in vocal or data form, during automatic intercellular transfers. This improvement in quality is obtained both by a reduction in the duration of the transfer itself and by the introduction of macrodiversity which enables the maintaining, for a certain time, of the mobile station in a link with the former base station and the new target base station. The information elements flowing through these two links are combined at a point of the network in order to provide a single flow of information of higher quality.

This invention may be implemented in a particularly promising way on two types of existing networks, namely networks meeting the DQDB (Distributed Queue Dual Bus) standard and those meeting the ATM (Asynchronous Transfer Mode) standard.

2. Description of the Prior Art

The aim of a GSM (Global Systems for Mobile Communications) type network where the transmission between the mobile station and the network is digital is that it provides telecommunications services to subscribers irrespectively of their movements within a service area. The mobile subscriber uses a mobile station, generally formed by a mobile piece of equipment, that gives the radio and software capacities needed for the dialog with the network. The presently used radiotelephony networks, such as the GSM network, have a centralized star architecture as can be seen in FIG. 1, comprising base stations (BTS or Base Transceiver Stations) that ensure the radio coverage of the service area and are each linked to a Base Station Controller (BSC). Each base station controller (BSC) is connected to a mobile services switching center (MSC) itself connected to the subscribers of the fixed network. Physically, the information and the signals flow between the mobile object and the mobile services switching center. The base station controller organizes the supervision, allocation and releasing of the radio channels for activities that it does not analyze, having no knowledge of the subscribers, their identities and their calls, while the mobile services switching center manages the setting up of the call, the release of the call and all that is related to the identities of the subscribers and their calls.

Assuming that there will be a rapid development of radiotelephony, it is necessary to envisage small-sized cells for high density zones, but the reduction of the size of the cells as compared with presently used systems calls for an improvement in the devices enabling automatic intercellular transfers because these transfers will become more frequent, an automatic intercellular transfer (AIT) enabling a mobile station to change its point of linkage to the land-based network while at the same time maintaining the call that is in progress.

This generally star-shaped architecture of radiotelephony networks makes it necessary to set up a new circuit from a fixed point up to a new base station. This means that it becomes necessary to implicate the entity or entities located between the fixed point and new the base station. This has the drawback of creating substantial time gaps, of more than 200 ms for the GSM system. These gaps are perceptible by the user or interrupt the transmission of data for a non-negligible period of time.

A second drawback of this star-shaped architecture is the impossibility of direct communication between the base stations or between the base station controllers, for it is obligatory to go through the higher hierarchical level, namely the base station controller or the mobile services switching center. This indirect communication unnecessarily burdens the processor managing this higher level and delays the arrival of the messages at the destination base station. These messages are used partly to control the intercellular transfers.

A third drawback is the impossibility of sharing the total passband among the different ends of the star should a link between a base station and the base station controller or between a BSC controller and an MSC switch be saturated while the neighboring link is free.

Finally, the introduction of macrodiversity, namely the simultaneous use of two or more radio links, makes it necessary for currently used radiotelephony systems to manage a particular unit of equipment in the network or the mobile station (MS) and procedures to activate, implement and stop the macrodiversity. This unit of macrodiversity equipment should manage, firstly, the two circuits, the old and the new, concerned by the call in progress, in the downward or upward direction from the mobile stations to the network and, secondly, the release of the old link when it becomes unnecessary. Furthermore, in the case of macrodiversity in the mobile station, it is necessary to possess or set up a second downward link that will convey the same information element from the network to the mobile stations as the one carried by the first downward link. Two links are thus used to convey the same information element.

SUMMARY OF THE INVENTION

A first object of the invention is an access network for a mobile radiotelephony network, formed by a dual bus or a dual counter-rotating ring to which there are connected, directly or by a concentration node, several base stations each capable of receiving one or more mobile stations, the passageway between said access network of the mobile network and the fixed telephone network being provided by an access point, and wherein, to each mobile connection between the fixed network through the access point and a mobile station through a base station managing said mobile station, there is assigned a pair of virtual circuits, independent of the type of service rendered by said connection and independent of the base station, so long as the mobile station remains in the same access network, the identification of the virtual circuits being carried by the header of the cells that convey information elements during the connection.

Another object of the invention is a method of intercellular automatic transfer between two base stations of the access network of a mobile radiotelephony network as characterized above, receiving the same mobile station by two distinct radio links, said method comprising the following steps:

1) the dispatching of a message setting up a new virtual link by the mobile station or by the first base station to the second base station, said message containing the references of the connection made between the access point and said first station as well as the virtual circuit identifiers to be used in reading and in writing, identical to those used for said connection in progress that is to be transferred;

2) the creation, in the upper layers of the second base station, of a context associated with said connection to be transferred;

3) the association, by the layer of the second base station managing the virtual circuits of the ring, of the virtual circuit identifiers of said connection to be transferred to the connection endpoint corresponding to the context related to said connection to be transferred;

4) the destruction of the context of the connection in the first base station.

With regard to the application of the invention to networks according to the DQDB standard, the article by A. D. Malyan, R. W. Donaldson and V. C. M. Leung: "A Personal Communication Network Architecture Using The IEEE 802.6 MAN", Proc. ICC92, Paper 342.6, 1992, proposes the use of the isochronous service provided by this standard. This means that it is not possible to set up macrodiversity without modification of the access network. This is why the invention uses the asynchronous service oriented connection of the DQDB standard, as shall be explained further below.

As for ATM networks, the article by K. S. Meier-Hellstern, G. P. Pollini and D. J. Goodman: "A Wireless service for the IEEE 802.6 Metropolitan Area Network", Proc. Globecom 91, Phoenix, Arizona, Paper 55.6, Dec. 2–5, 1991, proposes the use of virtual circuits to hold the call during an automatic intercellular transfer without proposing either the extension of the principle to a ring network providing a service of virtual circuits as is possible with the ATM or the use of macrodiversity.

Another object of the invention relates to a method for the implementation of macrodiversity between two base stations, each connected by a distinct radio link to one and the same mobile station, said method comprising:

a step of automatic intercellular transfer between said two base stations, as defined by the steps 1 to 3 of the preceding characteristic, without destruction of the context of the connection in the first base station and a step for the use of a coherent numbering of the segments conveyed by the cells sent out, during the connection, by the mobile station to the access point and by the access point to the mobile station in the case of macrodiversity at the mobile station.

Two other objects of the invention relate to methods of setting up a connection between a subscriber to a communications network and a mobile station that is a subscriber to a radiotelephony network, one of them using an access network that meets the DQDB standard and the other using an access network that meets the ATM standard, these access networks being formed by a dual ring or a dual bus as characterized here above.

BRIEF DESCRIPTION OF THE DRAWINGS

Other features and advantages of the invention shall appear from the following description of particular exemplary embodiments, illustrated by the drawings appended hereto of which, apart from FIG. 1 already described, which is a schematic view of a GSM type star network.

MORE DETAILED DESCRIPTION

Figure 1:
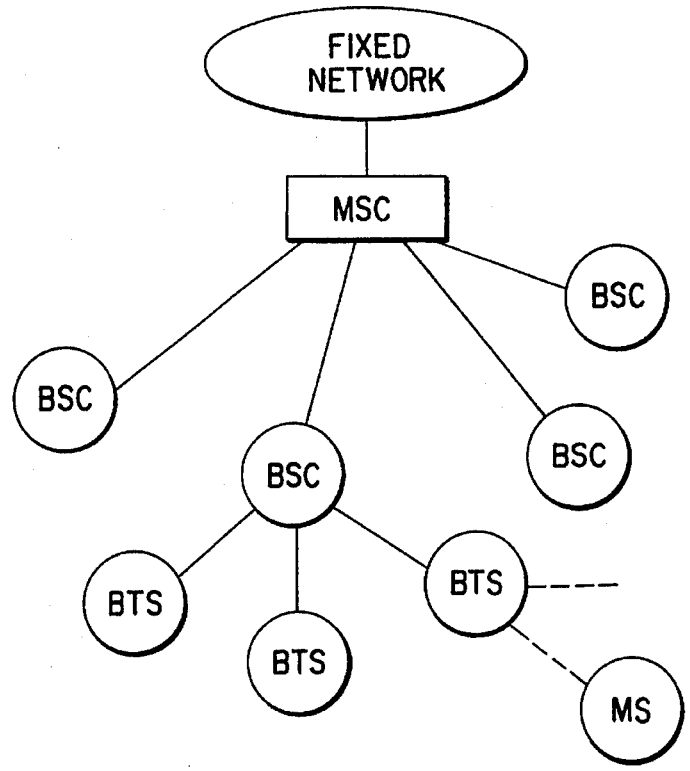
Figure 2:
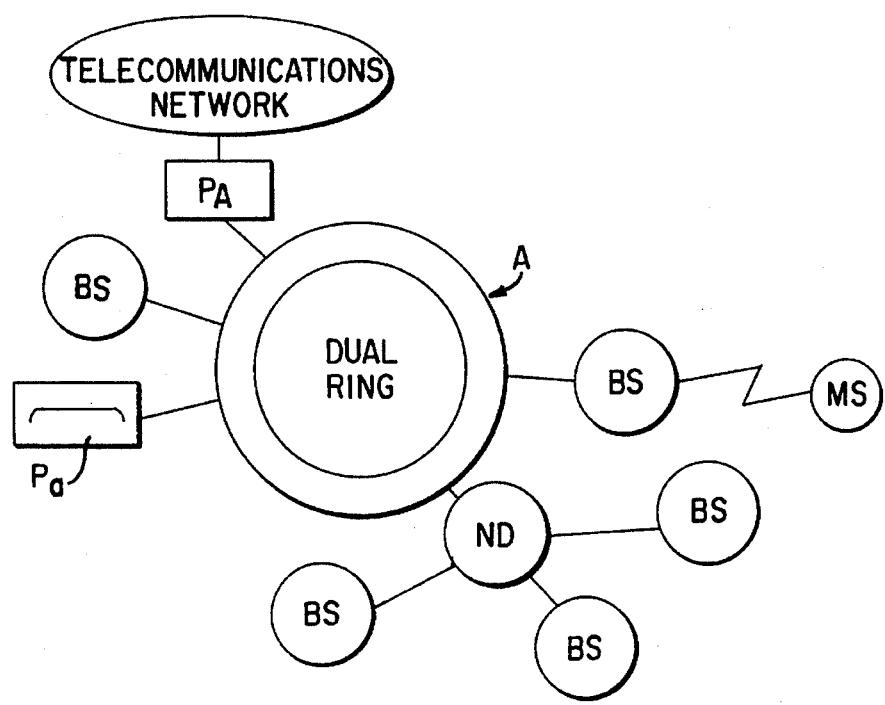
FIG. 2 is a drawing of an access network according to the invention.

The access network that is an object of the present invention comprises a counter-rotating dual ring or dual bus to which there are interconnected all the base stations or BS. This access network is used as an intermediary between the mobile station or stations MS moving between the base stations and their fixed or mobile correspondents. The base stations are connected to this access network, also called a local mobile network LMN, either directly or by means of a concentration node ND, as can be seen in FIG. 2 which shows the drawing of a local mobile network with a dual ring, according to the invention. When a base station is connected to the network by a concentration node, its control function may be fulfilled by the node itself. This local mobile network is itself linked to a telecommunications network by a passageway, called an access point PA that should be located at one of the ends of the dual bus or of the ring. Several local mobile networks may be interconnected either by the access point or by a specific passageway $P_a$.

According to a basic feature of the invention, an access network such as this is capable of the independent management without intervention by the access point, i.e. directly between the base stations, of the transfers from mobile stations between the base stations that are connected to it. Thus, neither the telecommunications network to which it is attached nor the access point participate in the mobility during the call, provided that the mobile station remains within the field of action of the base stations forming part of the local mobile network. When a call has to be set up between a mobile station and its caller or the converse, then a mobile connection occurs between the base station managing said mobile station and the access point to the telecommunications network, to which a pair of virtual circuits is allocated. Each virtual circuit is dedicated to one direction of the call between the telecommunications network and the mobile station. It is also possible to arrange for the allocation of the virtual circuits to be coordinated for the two buses so that the virtual circuit identifiers are equal. It is known that this circuit is called virtual because the communications capacity is allocated only when two entities of the network (the access point and the base station) have need of it and it is independent of the type of service rendered by the connection.

The identifier of the virtual circuit used during a call is on the header of the cells that provide for the conveyance of the information elements.

A communication between a mobile station and a partner calls for a mobile connection between the base station to which the mobile station is connected by radio, and the access point of the local mobile network. This base station and the access point each form a node of the ring or of the dual bus and fulfil two functions. The first function corresponds to a process of interfunctioning towards the radio in the case of a base station and towards the telecommunications network in the case of the access point. The second function corresponds to the membership of said node in the ring or in the dual bus. When a mobile station or a partner, external to the local mobile network, wishes to make a call, he should make a request for setting up a connection that activates an interfunctioning process in the upper signalling layers that results in commands (also known as primitives) to the layer managing the virtual circuits of the ring or of the dual bus. At the request of the upper layers, the layer of the node of the dual bus or of the ring, namely the base station or the access point, which manages the virtual circuits, associates the virtual circuits or circuit identifier (VCI) with the connection endpoint (CEP) representing the outward extension of the mobile connection in progress.

For each direction of the connection, namely for the writing and reading of information elements on the bus, which will be read by the access point or the base station, a virtual circuit is needed. The message for setting up the connection addressed to a node of the dual bus or of the ring has the virtual circuit identifier or identifiers. The connection endpoint extending the mobile connection towards the exterior of the ring or of the dual bus is chosen by the node and is used only as an internal reference. During the call, the cells conveying the information elements on the ring and bearing the reading virtual circuit identifier to identify the connection endpoint are sent to the upper layers. In the other direction, to the writing cells coming from the upper layer, there will be added the writing virtual circuit identifier to identify the other connection endpoint.

When the operations have been carried out, the layer of the node that manages the virtual circuits sends up an indication of success or failure to the upper layers to indicate the end of the setting up of a connection. The same sequencing of operations is achieved on both sides of the connection in order to enable the setting up of the connection from end to end.

Figure 3:
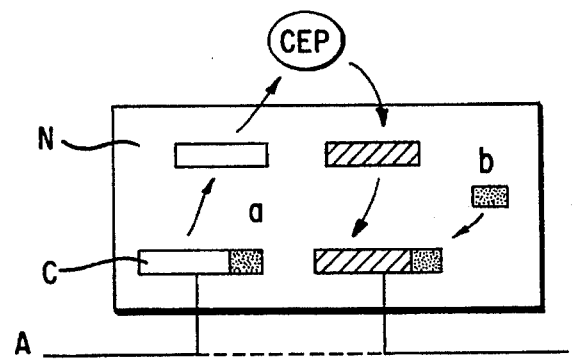
FIG. 3 provides a schematic indication of the working of a node of a network according to the invention.

FIG. 3 gives a schematic view of the working of a node N of the local mobile network. As soon as the virtual circuits are set up for the connection, the cells C flowing in the ring A or the dual bus and bearing the reading virtual circuit identifier a are copied in each node of the network (access point or base station) so that their analysis is done in each node while they continue to flow in the bus to the other nodes. Then, after analysis of said identifier and should the identifier be known and associated with a connection endpoint, the cells are sent to the upper layer of the node by means of the concerned connection endpoint CEP, without said identifier. In the other direction of the communication, when the connection endpoint CEP sends information cells to the node of the network, this network adds the writing virtual circuit identifier b to them before inserting them into the flow of the ring.

The invention can be used to carry out automatic intercellular transfer within the local mobile network. For this purpose, the same virtual circuit identifier is kept and only one of the two connection endpoints is modified. The access point does not take part in the operation.

Figure 4:
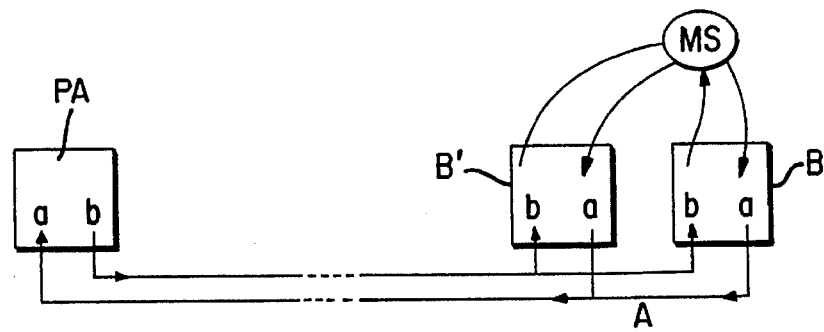
FIG. 4 gives a schematic view of an automatic intercellular transfer.

In the case of a transfer between two base stations B and B' for example, as can be seen in FIG. 4, while a first connection is already set up between the access point of the local mobile network and a first base station B to which a mobile station is connected by radio links, and whereas the mobile station MS in question is moving towards a second station B', this second station, in turn, receives a message for setting up a connection, namely a message that could come either from the mobile station itself after the setting up of the radio link with the second base station or from the first base station or from a third entity specialized in the management of automatic intercellular transfers. According to the invention, the message contains the references of the connection in progress, as well as the identifiers a and b of the virtual circuits to be used, which are the same as those used for the connection that has been set up between the access point and the first base station and has to be transferred. In order that this transfer may be possible, it is necessary that all the base stations should be positioned on one and the same medium, that they should be capable of reading all the communications and that the access point should be located at one of the ends of the dual bus or ring. This medium should therefore be a ring or a dual bus and not a star network as in the prior art. Thus, the access point PA of the local mobile network does not come into action and continues to send and receive cells on the same virtual circuits a and b of the ring A.

The setting up of the new link between the access point and the mobile station is carried out by commands or primitives up to the layer managing the virtual circuits of the new base station which will then set up the context needed for reception and transmission on these virtual circuits.

From the information point of view, this is a transfer of context associated with the virtual circuits between the old base station and the new base station. The access point of the network does not play a part in the transfer of the mobile connection. The transfer amounts to an operation of half-setting up a connection. The message of setting up a connection enables the recreation of the context of the connection in the new base station while at the same time associating it, on the radio interface side, with different physical characteristics. There are two possible cases: either the context of the connection in the first base station is destroyed or it is kept at the same time to bring about macrodiversity. Bringing about macrodiversity means maintaining, for a certain time, both the link connecting the mobile station to the former base station and the link connecting it to the new base station. When the automatic intercellular transfer takes place, the connection between the access point and the mobile station has the following configuration: in the downward direction, from the access point to the mobile station, the same cells sent by the access point are read by two different base stations which, if the mobile station uses a macrodiversity operator, sends them by two different radio paths towards the mobile station. In the upward direction from the mobile station to the access point, the mobile station sends the same information to both base stations in the form of cells that they transmit to the access point with the same virtual circuits on the bus, if the access point uses macrodiversity.

When the cells carrying the information go through the mobile station towards the access point of the network or conversely from the access point towards the mobile station, there needs to be a reference base common to both base stations so that the two homologous segments containing the same information are referenced in the same way and so that the macrodiversity operator at the access point or, conversely, at the mobile station associates these two homologous segments. To this end, it is necessary that the segments conveyed by the cells should be numbered in order to be matched two by two, with a view to being combined. This operation is designed to improve the quality of the information reaching its addressee. The combination can be done by means of a binary choice based on a comparison. It is also possible to combine the two homologous segments to obtain a resultant information element of better quality. For the downward direction, the numbering of the segments in the cells may be done by the mobile station itself which allocates the sequence number to the segments or by the base stations concerned by the macrodiversity. In the latter case, it is necessary that two identical segments, each sent by a radio link between the mobile station and one of the base stations, should be provided with the same number, given by the two base stations. One of the means to obtain a coherent numbering such as this consists in using the radio frame numbers of the base stations when said base stations are synchronized at least at the level of the frame. Another means consists in sending a synchronization beep to the two base stations simultaneously by the mobile station itself at the outset of the call so that the stations receive the same segment at the same time.

For the upward direction, the numbering is done by the access point.

The invention can be used to easily obtain macrodiversity both in the mobile station and in the network, without any addition of protocol devices or complex software programs. All that is needed is a macrodiversity operator at the access point of the local mobile network and/or at the mobile station. Indeed, if several segments bearing the same sequence number reach the macrodiversity operator, they are taken into account, compared or combined. However, if only one segment reaches the macrodiversity operator, the other homologous segment being lost in the radio link or having not yet been transmitted, it is transmitted directly to the subscriber without macrodiversity. This shows that the start and the end of a macrodiversity phase do not need to be explicitly announced. All that is needed is that the two radio links between the mobile station and the base stations, and therefore the two half-connections to the access point PA of the network, should be held simultaneously during the macrodiversity. On the other hand, the local mobile network should be capable of allocating the resources easily to permit the duplication of upward traffic from the mobile station to the network for a short period of time.

The macrodiversity at the mobile station does not require the duplication of the downward traffic since the same information can be copied by both the base stations. This is an advantage as compared with the star networks which require the duplication of the downward traffic in order to implement macrodiversity in the mobile station.

A particularly valuable application of the invention relates to the use of a network according to the DQDB standard IEEE 802.6 which has a ring or dual bus architecture, as a medium of transmission to the access network of a radio-telephony network.

The network is formed by a dual ring or dual bus to whose nodes there are connected the base stations either directly or by being grouped into sub-stations. The two bus heads of the ring may be co-localized at the access point PA. This enables the distribution of the flow of information elements on the two buses. Thus, each circuit between the access point of the network and a base station may be set up by either bus, thus enabling a more efficient management of the traffic, circuit by circuit, and a certain degree of resistance to bus interruptions.

At present, the use of the synchronous service as described in the above-mentioned publication does not enable macrodiversity. Indeed, the synchronous bus reserves a certain number of bytes for a call. These bytes are generated at a rate compatible with the bit rate of the call that is conveyed. During a transmission of information, a base station writes in these bytes without knowing if they are free or not. During a macrodiversity operation, a second base station could write information on bytes in which the first station has already written and could therefore erase the first information elements. Furthermore, the bit rate supported in the upward direction is double: now the reserved slots are assigned for the bit rate of the call, so that it is impossible to obtain a medium for the macrodiversity without modification of the virtual circuit allocated for the communication.

For these reasons, the invention uses the connection oriented service of the DQBD standard which is based on the QA (Queue Arbitrated) slots allocated according to need in keeping with the principle of the distributed queue described in the DQDB IEEE 802.6 standard. The description of the DQDB standard is organized in functional blocks whose interactions are managed by a management entity. Among these function blocks, there is a block entrusted with a management of the QA (Queue Arbitrated) slots and a block entrusted with the convergence function COCF (Connection Oriented Convergence Function) used for the connection oriented service. To achieve the interaction between the convergence function and the QA slot management function, the management entity (LME) uses the primitive OPEN-CE-COCF on the one hand and the primitive CLOSE-CE on the other hand. The primitive OPEN-CE-COCF enables the association, within the block managing the QA slots, of a connection endpoint CEP with the virtual circuits used in writing and in reading while the primitive CLOSE-CE cancels this association. These primitives are specified in the standard but their implementation is optional. They enable the associating of a call with the virtual circuits that convey it. The following example of an implementation of the invention does not entail any pre-established ideas about the convergence function (COCF) for the connection oriented services. For the operations of reading information elements coming from the access network according to the DQDB standard, the block managing the QA slots of the base station receives all the cells marked as being busy and relating to the connection associated with a connection endpoint CEP, checks the validity of the front header before withdrawing it and passes the segments thus obtained to the connection endpoint corresponding to the virtual circuit identifier (VCI) included in the header. Conversely, for the operations of writing information elements coming from a mobile station, to a correspondent of the mobile station, the block managing the QA slots of the base stations receives the segments coming from a connection endpoint, adds to them the header containing the virtual circuit identifier that is associated with this connection endpoint and specified by the convergence function and then sends the cell thus formed towards the appropriate bus to the access point of the network. The same write and read operations take place at the access point for the transmission and reception of the segments to the mobile station of the correspondent.

Another particularly valuable application of the invention relates to the use of a network according to the ATM standard, as a medium of transmission to the access network of a radiotelephony network. It is a technique of transfer on a wideband communications network enabling the conveyance of any type of information in the form of cells of constant length, comprising a 5-byte header and a 48-byte information field. The header contains, inter alia, a virtual paths identifier (VPI) field, and a virtual circuit identifier (VCI) field having 16 bits, that identifies the number of the call whose data elements are in the course of being transferred.

The set of base stations of the network are distributed into sub-units that corresponding to switching zones. A switching zone can contain only base stations and the base stations of one and the same switching zone are connected to one and the same ATM switch. The access point PA is itself an ATM switch. An ATM switch is connected to the telecommunications network by at least four virtual paths, two for the incoming of the information elements and two for the outgoing of these information elements. The virtual paths are organized into incoming-outgoing pairs to form a data bus in each direction. The same virtual paths are furthermore connected to other switches forming part of the same ring, by means of the shuffling network. Each ATM switch then forms a node of the ring, the two buses of which are formed by the connections of the virtual paths. A pair of virtual circuits is associated with each call set up between the access point and a mobile station.

For each bus of the ring, the ATM switch receives all the flux, copies the cells into the outgoing virtual path associated with the incoming virtual path and compares the VCI identifier of each cell with the VCI identifiers pertaining to each of the base stations of the switching zone. Should this cell relate to a base station, the switch removes the VPI identifier from the virtual path of the header, replaces it by a bus number corresponding to the virtual path used by the cell and copies the cell into the station.

One of the ATM switches of the ring must fulfill a bus head function, namely act as a well for the incoming cells.

The switching functions that must be fulfilled by an ATM switch between the different base stations of a switching zone may be carried out by two bi-directional buses or by a direct distribution of the cells internal to the switch as a function of its switching table.

When a virtual circuit is set up, the switching stage is programmed to extract the cells having the indicated virtual circuit identifier VCI from the incoming flux. The switching operation may be complemented by the selection of an adaptation layer, this selection being, if need be, decentralized in each base station.

Figure 5:
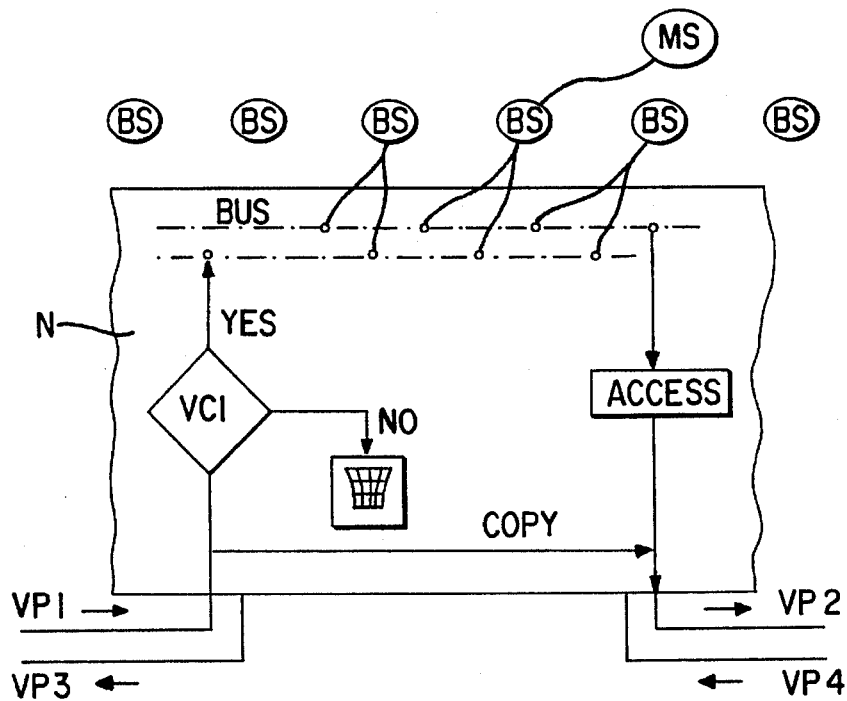
FIG. 5 gives a functional view of an ATM ring switching center dedicated to the application in the framework of a mobile local area network.

FIG. 5 is the functional diagram of an ATM ring switch dedicated to the application in the context of the local mobile network.

Thus, the node N or ATM switch into which the first virtual path $VP_1$ enters systematically copies the cells into the output virtual path $VP_2$ and examines the virtual circuit identifiers VCI borne by the header of the incoming cells.

If there are no VCI identifiers corresponding to a connection managed by one of the connected base stations BS, it drops the cell. If not, it sends it on an internal bi-directional bus to which the base stations are connected. The concerned base station may read the cells that are assigned to them and send them to the mobile station MS without the VCI identifier in the header. In the other direction, the mobile station may write and the base station concerned may use a virtual circuit. The cells that are written in should follow a procedure of access to the virtual paths $VP_2$ or $VP_3$ depending on the direction in which the cells have to go. Indeed, they arrive on a dual bus in which there flow the information elements coming from $VP_1$ and $VP_4$. The copying ensures the continuity of the ring, i.e. the information elements on the virtual paths continue to flow through the node even if some of them are sent to the base stations. The access point is also an ATM switch that works according to the same principle and carries out the well function for each of the buses.

It is noted that the invention can be applied to an ATM network as well as to a DQDB network. All that it needs is a virtual circuit service and cells having a header with the virtual circuit identifier to which they belong.

The following are the advantages of the invention: The intercellular transfers are possible without any intervention from the upper hierarchical level, namely the access point of the ring, for the base stations interact directly with one another by means of a ring or a dual bus. Thus the transfer time is reduced, and the work load of the access point is smaller as is the quantity of signalling. The use of virtual circuits enables the easy introduction of macrodiversity and, consequently, the improvement of quality during the transfers.

The operations of insertion and deletion of the links for the macrodiversity are implicit. Each base station has access to the entire passband of the ring, making it possible to benefit totally from the aggregating effect. Furthermore, the pair of virtual circuits are independent of the type of service rendered by the mobile connection and independent of the base station so long as the mobile station remains in the access network.

What is claimed is:

1. An access network for a mobile radiotelephony network, comprising:

I) a dual bus; and

II) a plurality of base stations connected to said dual bus, each of said plurality of base stations capable of receiving signals from a plurality of mobile stations, wherein A) a passageway between said access network and a fixed telecommunications network is provided by an access point, B) to each mobile connection between said fixed telecommunications network and one of said plurality of mobile stations there is assigned a pair of virtual circuits, each of said pair of virtual circuits being dedicated to one direction of said mobile connection, each mobile connection being routed through both said access point and one of said plurality of base stations, said pair of virtual circuits being independent of i) the type of service rendered by each mobile connection and ii) said one of said plurality of base stations, so long as said one of said plurality of mobile station remains in said access network and C) an identification of said pair of virtual circuits is borne by a header of a plurality of cells that convey information elements during each mobile connection.

2. A method for setting up a mobile connection between a mobile station that is a subscriber to a mobile radiotelephony network and a subscriber to a fixed telecommunications network, said method comprising:

I) providing an access network for said mobile radiotelephony network, said access network including:

A) a dual bus; and

B) a plurality of base stations connected to said dual bus, each of said plurality of base stations capable of receiving signals from a plurality of mobile stations, wherein 1) a passageway between said access network and a fixed telecommunications network is provided by an access point, 2) to each mobile connection between said fixed telecommunications network and one of said plurality of mobile stations there is assigned a pair of virtual circuits, each of said pair of virtual circuits being dedicated to one direction of said mobile connection, each mobile connection being routed through both said access point and one of said plurality of base stations, said pair of virtual circuits being independent of i) the type of service rendered by each mobile connection and ii) said one of said plurality of base stations, so long as said one of said plurality of mobile station remains in said access network and 3) an identification of said pair of virtual circuits is borne by a header of a plurality of cells that convey information elements during each mobile connection;

II) requesting a setting up of a mobile connection between one of said plurality of base stations and said access point, said one of said plurality of said base stations being a first node of said access network and said access point being a second node of said access network, said requesting including sending a message that
i) contains identifiers of said pair of virtual circuits and
ii) activates commands that are sent from at least one upper layer of said access network to a lower layer of said access network, said lower layer managing both said identifiers, and said pair of virtual circuits, at one member selected from the group consisting of said first node and said second node, said lower layer then creating an association between said identifiers and said one member;

III) sending an indication to said at least one upper layer from said lower layer to indicate an ending of the setting up of the mobile connection;

IV) reading data at both said first node and said second node, said reading including:
  A) circulating a plurality of cells on a ring;
  B) copying said plurality of cells;
  C) analyzing said identifiers;
  D) removing a reading identifier from said plurality of cells; and
  E) passing said plurality of cells to said at least one upper layer; and V) writing data including:
  A) sending a plurality of information cells from said first node to said second node;
  B) adding writing identifiers to said plurality of information cells; and
  C) inserting said plurality of information cells into a flow of the ring.

3. A method of automatic intercellular transfer between two base stations of an access network of a mobile radiotelephony network, said method comprising:

I) providing the access network, said access network including:
  A) a dual bus; and
  B) a plurality of base stations connected to said dual bus, each of said plurality of base stations capable of receiving signals from a plurality of mobile stations, wherein
    1) a passageway between said access network and a fixed telecommunications network is provided by an access point,
    2) to each mobile connection between said fixed telecommunications network and one of said plurality of mobile stations there is assigned a pair of virtual circuits, each of said pair of virtual circuits being dedicated to one direction of said mobile connection, each mobile connection being routed through both said access point and one of said plurality of base stations, said pair of virtual circuits being independent of i) the type of service rendered by each mobile connection and ii) said one of said plurality of base stations, so long as said one of said plurality of mobile station remains in said access network and
    3) an identification of said pair of virtual circuits is borne by a header of a plurality of cells that convey information elements during each mobile connection;

II) receiving one of said plurality of mobile stations by two distinct radio links, wherein said receiving includes:
  1) dispatching a message setting up a new virtual link to a second base station, said message containing the references of the mobile connection in progress between the access point and said first base station as well as the virtual circuit identifiers to be used in reading and in writing, identical to those used for said mobile connection in progress that is to be transferred;
  2) creating, in at least one of a plurality of upper layers of the second base station, a context associated with said mobile connection to be transferred;
  3) associating, by the layer of the second base station managing the virtual circuits of the ring, of the virtual circuit identifiers of said mobile connection to be transferred to the mobile connection endpoint corresponding to the context related to said mobile connection to be transferred; and
  4) destroying a context of the mobile connection in the first base station.

4. A method for the simultaneous use of two or more radio links connecting a mobile station to two or more base stations in order to bring about macrodiversity, said method comprising:

I) a step of automatic intercellular transfer between a first base station and a second base station, said step of automatic intercellular transfer including:
  1) dispatching a message setting up a new virtual link to said second base station, said message containing the references of the mobile connection in progress between the access point and said first base station as well as the virtual circuit identifiers to be used in reading and in writing, identical to those used for said mobile connection in progress that is to transferred;
  2) creating, in at least one of a plurality of upper layers of said second base station, a context associated with said mobile connection to be transferred; and
  3) associating, by the layer of said second base station managing the virtual circuits of the ring, the virtual circuit identifiers of said mobile connection to be transferred with the mobile connection endpoint corresponding to the context related to said mobile connection to be transferred; and II) a step of coherent numbering of a plurality of segments conveyed by a plurality of cells sent out by the mobile station to an access point and by the access point to the mobile station in the case of macrodiversity at the mobile station.

5. A method for the simultaneous use of a plurality of radio links, comprising connecting a mobile station to a plurality of base stations, the plurality of radio links being synchronized at a frame level, said connecting including a step of coherent numbering of a plurality of segments, said step of coherent numbering including giving to each of said plurality of segments a number, said number being a radio frame number of said two synchronized base stations.

6. A method according to claim 4; wherein the step of coherent numbering of the plurality of segments includes sending a synchronization beep to the plurality of base stations, simultaneously, from the mobile station at the outset of a call.

7. A method of setting up a mobile connection between a subscriber to a telecommunications network and a mobile station that is a subscriber to a radiotelephony network, said method comprising:

I) using, as a medium of transmission to an access network that meets the distributed queue dual bus standard, said access network including:

A) a dual bus; and

B) a plurality of base stations connected to said dual bus, each of said plurality of base stations capable of receiving signals from a plurality of mobile stations, wherein 1) a passageway between said access network and a fixed telecommunications network is provided by an access point, 2) to each mobile connection between said fixed telecommunications network and one of said plurality of mobile stations there is assigned a pair of virtual circuits, each of said pair of virtual circuits being dedicated to one direction of said mobile connection, each mobile connection being routed through both said access point and one of said plurality of base stations, said pair of virtual circuits being independent of i) the type of service rendered by each mobile connection and ii) said one of said plurality of base stations, so long as said one of said plurality of mobile station remains in said access network and 3) an identification of said pair of virtual circuits is borne by a header of a plurality of cells that convey information elements during each mobile connection; and II) associating an endpoint with said pair of virtual circuits, said associating being performed by a primitive OPEN CE COCF used by a management entity LME within a functional block managing a plurality of queue arbitrated slots, wherein a functional block managing the queue arbitrated slots performs the following steps for reading information elements coming from the access network that meets the distributed queue dual bus standard:

A) receiving all cells marked as being busy;

B) checking validity of a header of said plurality of cells;

C) eliminating said header which includes a virtual circuit identifier in reading mode; and D) transmitting a plurality of segments thus obtained to a plurality of upper layers, said transmitting being towards a mobile connection endpoint corresponding to the virtual circuit identifier in reading mode, and wherein the function block performs the following steps for writing information elements on the access network:

A) receiving, by the upper layers, of segments sent out by the mobile connection endpoint;

B) adding of a header containing the virtual circuit identifier in writing mode associated with the mobile connection endpoint and specified by a Connection Oriented Convergence Function used for a mobile connection oriented service; and C) transmitting a cell thus formed to an appropriate bus of the dual bus, said transmission being and towards a homologous point of the network.

8. A method for setting up a mobile connection between i) a subscriber to a telecommunications network and ii) a mobile station that is a subscriber to a radiotelephony network, said method comprising:

I) using, as a medium of transmission of information in the form of cells of constant length, an access network that meets the asynchronous transfer mode standard, said access network having a plurality of switching zones, each of said plurality of switching zones including a plurality of base stations connected to a single asynchronous transfer mode switch that is linked to the access network by at least four virtual paths organized in incoming/outgoing pairs to form a data bus in each direction and that includes a node of the ring of the access network;

II) operating to read transmitted cells including:

A) copying of cells arriving by an incoming virtual path into a respective outgoing path associated with the incoming virtual path;

B) examining a virtual circuit identifier of cells arriving in the single asynchronous mode transfer switch by an incoming virtual path;

C) destructing an examined cell if the virtual circuit identifier does not correspond to a mobile connection managed by a base station connected to the single asynchronous mode transfer switch or by an access point of the access network;

D) sending the examined cell on an internal bi-directional bus to which is connected the plurality of base stations and the telecommunications network if the virtual circuit identifier corresponds to a mobile connection managed by a base station and by the access point respectively; and E) reading cells by said base station and said access point respectively and dispatching to the mobile station and to the telecommunications network respectively without the identifier in the header, said reading including:

1) dispatching, by the mobile station to a base station, of the segments to which the base station adds a virtual circuit identifier; and 2) accessing from the written cells towards the respective virtual paths according to a direction of circulation of the cells.

\* \* \* \* \*